Dec. 8, 1936.  C. G. SEYFERTH  2,063,405
FIFTH WHEEL CONSTRUCTION
Filed July 20, 1935
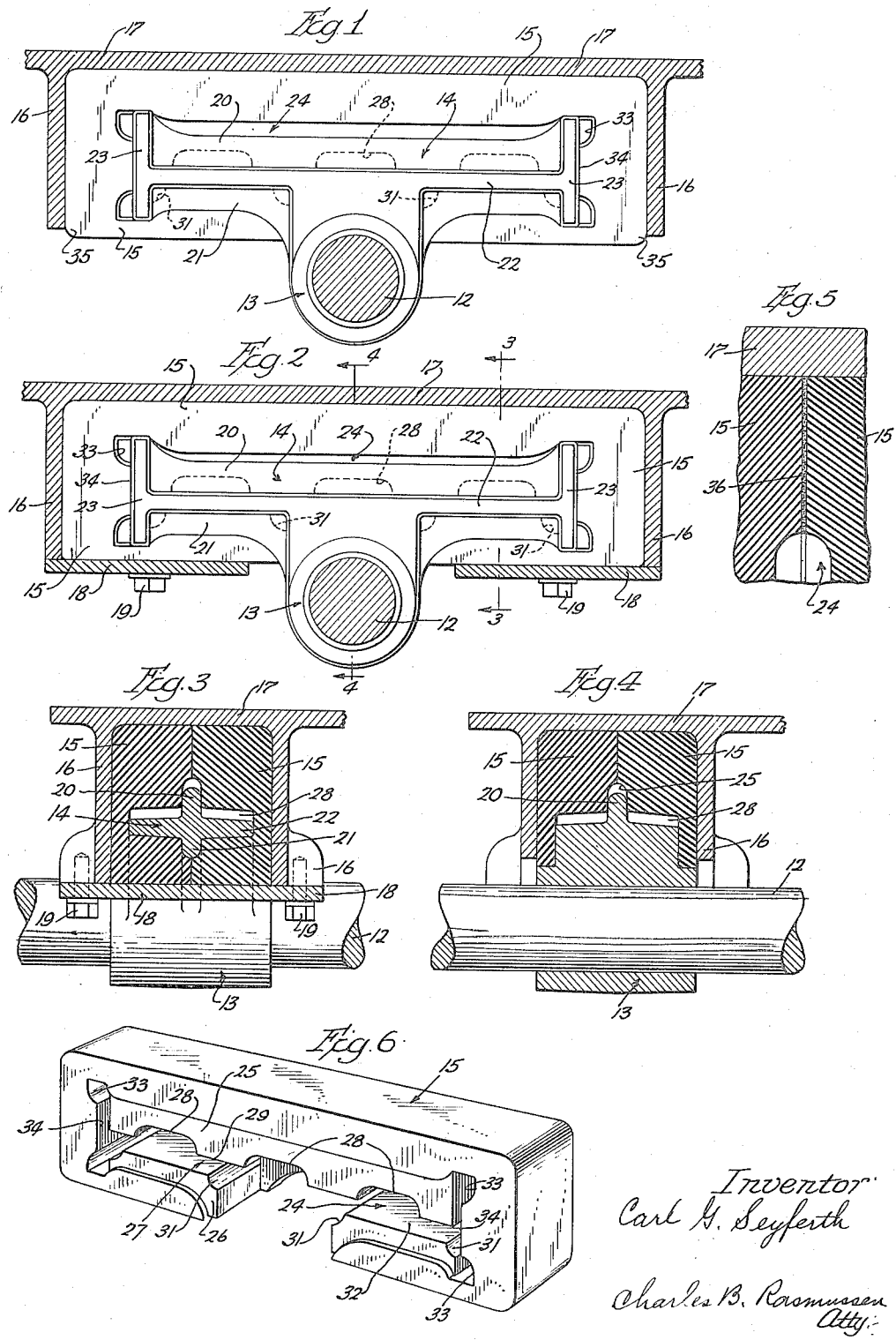
Inventor
Carl G. Seyferth
Charles B. Rasmussen
Atty.

UNITED STATES PATENT OFFICE 2,063,405

FIFTH WHEEL CONSTRUCTION

Carl G. Seyferth, Muskegon, Mich., assignor to West Michigan Steel Foundry Co., Muskegon, Mich., a corporation of Michigan Application July 20, 1935, Serial No. 32,338

3 Claims. (Cl. 280—33.1)

This invention relates in general to fifth wheel construction, and has more particular reference to yieldable fifth wheel coupling means between a tractor and a trailer vehicle. This application is for an improvement of the fifth wheel construction shown in United States Letters Patent No. 1,968,573 issued to me July 31, 1934.

A principal object of the invention is the provision of a fifth wheel construction embodying yieldable cushioning means interposed between the upper and lower fifth wheel elements, and disposed in spaced relation thereto, in which a secondary cushioning effect is obtained hydraulically.

To obtain this novel effect, the spaced relationship between the one fifth wheel element and the yieldable or resilient cushioning means is provided by means of airfilled recesses in the cushioning means, so that during relative movement between the fifth wheel elements, which is permitted, cushioned and resisted by the cushioning means, the air in these recesses is compressed to afford an additional cushioning effect.

Numerous other objects and advantages of the invention will be apparent as it is better understood from the following description, which, taken in connection with the accompanying drawing, discloses a preferred embodiment thereof.

In the drawing,

Figure 1 is a longitudinal sectional view through the yieldable connection between the upper and lower fifth wheel elements embodying the present invention, showing the several parts in assembled position before the bottom retaining plate is secured in place;

Fig. 2 is a longitudinal section, similar to Fig. 1, with the bottom retaining plate secured in position;

Fig. 3 is a vertical transverse sectional view taken substantially on the line 3—3 of Fig. 2;

Fig. 4 is a sectional view taken substantially on the line 4—4 of Fig. 2;

Fig. 5 is an enlarged detail sectional view similar to Fig. 4; and

Fig. 6 is a perspective view of one of the resilient cushioning members.

Referring more particularly to the drawing, but one of a pair of bearing members, indicated generally by reference character 13, is shown journaled on a cross shaft 12 which is supported transversely of the chassis of a tractor or the like (not shown). The relation of the cross shaft 12 and the bearing members 13 to the fifth wheel structure as a whole is illustrated in my above-mentioned Patent No. 1,968,573, and forms no part of the instant invention, which is clearly illustrated with reference to one of the bearing members 13 and its associated parts.

Each of the bearing members 13 is provided with an elongated portion, indicated generally at 14, which is mounted for floating or cushioned movement between a pair of resilient cushioning members 15 removably contained within a housing 16 formed integrally with the upper fifth wheel element 17.

The housing 16 is provided with a removable bottom retaining wall 18 which may be secured thereto by means of bolts 19, and by means of which access may be had to the interior of the housing in assembling the parts or for the purpose of replacement or repairs.

The elongated portion 14 of the bearing 13 extends longitudinally of the vehicle and is preferably cast with upper and lower longitudinally extending rib portions 20 and 21, respectively, horizontally extending rib portions 22, and vertically extending end or buffer plates 23, the general result being a casting of substantially cruciform cross-section as seen in Fig. 3.

The cushioning members 15 are arranged one on each side of the elongated portion 14 and extend longitudinally thereof. These members are preferably moulded of resilient material such as rubber or the like, and are provided with complementary recesses 24 on their inner faces conforming generally to the configuration of the elongated member 14 and adapted to receive and encase said elongated portion.

As shown in the drawing, each of the recesses 24 is provided with upper and lower longitudinally extending depressions or channels 25 and 26 which embrace the upper and lower ribs 20 and 21, respectively, with the side walls of the recesses abutting the sides of these ribs so as to limit lateral shifting of the elongated portion 14 of the bearing 13 except so far as the natural resilience of the material will permit. The recess 24 is also provided with a horizontal, longitudinally extending slot or recess 27 which embraces the adjacent horizontal rib 22 of the elongated portion 14.

Referring particularly to Fig. 6, it will be noted that each of the cushioning members 15 is provided adjacent the slot 27 with recesses 28 at intervals along its surface to provide a plurality of spaced abutments 29. The lower surface of the slot 27 is also formed with recesses 31 to provide a pair of spaced abutments 32. In like manner, the ends of the recesses 24 are formed with recesses 33 to provide centrally disposed end abutments 34.

The several parts above-described are substantially the same as the corresponding parts in my prior Patent No. 1,968,573, with three very important differences. The recesses 28, 31 and 33, especially recesses 28, are made somewhat larger in the instant device than in the patented structure. The blocks 15 are made larger than the housing 16, and upon assembling the several parts it will be noted (Fig. 1) that before the bottom retaining plate 18 is secured in place the blocks 15 protrude downwardly at 35 beyond the housing 16 an appreciable amount.

Before assembling the several parts, the inner faces of the cushioning blocks 15 are given a coating of rubber cement or other suitable adhesive. When positioned within the housing 16, this coating of adhesive material, indicated at 36 in Fig. 5, will have the effect of making an airtight seal between the two blocks 15.

After the parts are assembled within the housing 16, as shown in Fig. 1, the bottom retaining plate 18 is attached to the housing and drawn up tightly to the position shown in Fig. 2 by means of bolts 19. As this is done, the cushioning blocks 15 are forced into intimate contact with each other, the housing 16, and the elongated portion 14 of the bearing member 13 at the points of contact with the latter of the pads or abutments 29, 32 and 34. This results in the sealing of the air into each of the several recesses 28, 31, 33, and insuring against leakage of air therefrom.

From the above description it will be apparent that any relative movement between the two fifth wheel elements 12 and 17 will be effectively cushioned and the shock thereof absorbed, not only by the resilient blocks 15 alone, but by the air entrapped within the several recesses therein provided. When such relative movement between the bearing member 13 and the blocks 15 occurs, the material of certain of the abutments 29, 32, 34 will be spread or flowed into the adjacent recesses 28, 31, 33, depending upon the direction of such relative movement. This will result in a floating or cushioned movement between the bearing and the blocks in which the shocks otherwise resulting in stresses and strains in the several rigid parts will be absorbed by the cushioning members 15. In addition to the cushioning effect of the blocks 15, however, the resulting decrease in size of the recesses 28, 31, 33 will compress the air entrapped therein to produce a further cushioning effect. This dual cushioning effect is much more satisfactory and effective than that obtained in a structure wherein the hydraulic cushioning feature is not present.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fifth wheel construction including upper and lower fifth wheel elements, the combination of a housing carried by one of said elements, a bearing member carried by the other of said elements and having a portion thereof disposed within said housing, and cushioning means interposed between said bearing member and said housing for yieldably resisting relative movements between said bearing member and said cushioning means, comprising means for obtaining a secondary cushioning effect pneumatically.

2. In a fifth wheel construction including upper and lower fifth wheel elements, the combination of a housing carried by one of said elements, a bearing member carried by the other of said elements and having a portion thereof disposed within said housing, and cushioning means interposed between said bearing member and said housing for permitting floating movement between said bearing member and said cushioning means, said cushioning means having airtight recesses therein, and air entrapped within said recesses, whereby such floating movement will compress the air in said recesses to produce a secondary cushioning effect.

3. In a fifth wheel construction including upper and lower fifth wheel elements, the combination of a housing carried by one of said elements, a bearing member carried by the other of said elements and having a portion thereof disposed within said housing, and yieldable cushioning means interposed between said bearing member and said housing, said cushioning means having air-filled recesses therein, whereby relative movement between said bearing member and said cushioning means will deform said cushioning means and compress the air in said recesses to afford an additional cushioning effect.

CARL G. SEYFERTH.